(12) United States Patent
Chen et al.

(10) Patent No.: US 9,519,956 B2
(45) Date of Patent: Dec. 13, 2016

(54) PROCESSING STEREO IMAGES

(71) Applicant: Nokia Technologies Oy, Espoo (FI)

(72) Inventors: Ching-Hui Chen, Greenbelt, MD (US);
Hui Zhou, Sunnyvale, CA (US); Timo Ahonen, Redwood City, CA (US)

(73) Assignee: Nokia Technologies Oy, Espoo (FI)

( * ) Notice: Subject to any disclaimer, the term of this patent is extended or adjusted under 35 U.S.C. 154(b) by 155 days.

(21) Appl. No.: 14/193,508

(22) Filed: Feb. 28, 2014

(65) Prior Publication Data

US 2015/0248745 A1    Sep. 3, 2015

(51) Int. Cl.
*G06K 9/00*   (2006.01)
*G06T 5/00*   (2006.01)
*G06T 7/00*   (2006.01)

(52) U.S. Cl.
CPC .............. *G06T 5/003* (2013.01); *G06T 7/0075* (2013.01); *G06T 2207/10012* (2013.01); *G06T 2207/20228* (2013.01)

(58) Field of Classification Search
CPC ........ G06T 5/003; G06T 5/005; G06T 7/0075; H04N 13/0018; G03B 19/22
See application file for complete search history.

(56) References Cited

U.S. PATENT DOCUMENTS

| | | | | |
|---|---|---|---|---|
| 7,330,593 | B2 * | 2/2008 | Hong | G06K 9/20 382/171 |
| 8,300,085 | B2 * | 10/2012 | Yang | G06K 9/20 348/42 |
| 9,237,326 | B2 * | 1/2016 | Liao | G06T 5/005 |
| 9,237,330 | B2 * | 1/2016 | Wang | H04N 13/021 |
| 2007/0122028 | A1 | 5/2007 | Sun et al. | |
| 2011/0080464 | A1 | 4/2011 | Alessandrini et al. | |
| 2011/0091096 | A1 * | 4/2011 | Morris | G03B 19/22 382/154 |
| 2011/0222756 | A1 * | 9/2011 | Yea | G06T 5/005 382/154 |
| 2012/0062548 | A1 | 3/2012 | Pan et al. | |
| 2013/0033582 | A1 * | 2/2013 | Sun | H04N 13/0018 348/47 |
| 2013/0208093 | A1 * | 8/2013 | Sun | G06T 5/003 348/46 |
| 2013/0250062 | A1 | 9/2013 | Tin | |
| 2013/0287291 | A1 * | 10/2013 | Cho | G06K 9/46 382/154 |
| 2013/0329015 | A1 * | 12/2013 | Pulli | G06T 7/0075 348/47 |

(Continued)

OTHER PUBLICATIONS

International Search Report and Written Opinion for Application No. PCT/FI2015/050109 dated Sep. 4, 2015.

(Continued)

*Primary Examiner* — Gregory M Desire
(74) *Attorney, Agent, or Firm* — Alston & Bird LLP

(57) ABSTRACT

A method comprises estimating disparity values for pixels located in an occluded region of a first one of a defocused pair of stereo images using: a first set of blur map data corresponding to the first one of the defocused pair of stereo images; a first set of disparity map data corresponding to the first one of the defocused pair of stereo images; and a first set of occlusion map data corresponding to the first one of the defocused pair of stereo images.

38 Claims, 8 Drawing Sheets

(56) References Cited

U.S. PATENT DOCUMENTS

2014/0267243 A1* 9/2014 Venkataraman ...... G06T 7/0065
 345/419
2015/0248745 A1* 9/2015 Chen ...................... G06T 5/003
 382/154

OTHER PUBLICATIONS

Jain, R. et al., *Machine Vision*, Chapter 11, McGraw-Hill (1995) 289-308.

Popkin, T. et al., *Image Coding Using Depth Blurring for Aesthetically Acceptable Distortion*, IEEE Tr. Image Processing, vol. 20, No. 11 (Nov. 2011) 3039-3050.

Couzinie-Devy, F. et al., *Learning to Estimate and Remove Non-Uniform Image Blur*, IEEE Conference on Computer Vision and Pattern Recognition (2013) 8 pages.

Li, F. et al., *Dual Focus Stereo Imaging*, J. Electron Imaging 19(4), 043009, (Feb. 9, 2010, Jul. 26, 2010, Aug. 30, 2010, Dec. 6, 2010) 17 pages.

Lin, J. et al., *Absolute Depth Estimation from a Single Defocused Image*, IEEE Transactions on Image Processing, vol. 22, No. 11 (Nov. 2013), pp. 4545-4550.

Rajagopalan, A. N. et al., *Depth Estimation and Image Restoration Using Defocused Stereo Pairs*, IEEE Transactions on Pattern Analysis and Machine Intelligence, vol. 26, No. 11, (Nov. 2004), pp. 1521-1525.

* cited by examiner

Right stereo image

Right-to-left disparity map

Left stereo image

Left-to-right disparity map

Right blur map

Right blur-disparity map inc. occlusion region

Right occlusion map

Right blur-disparity map ex. occlusion region

Final right-to-left disparity map

Updated right-to-left disparity map

PROCESSING STEREO IMAGES

FIELD

This specification relates to the processing of stereo images. In particular, this specification relates to estimating disparity values for pixels in at least one of a pair of stereo images.

BACKGROUND

Estimating disparity from a pair of stereo images is a technique that has been well studied with the estimated disparity being used in the extraction of further information from the stereo images. For instance, the estimated disparity can be used for depth/distance calculation. Disparity between the location of an object in each of the pair of images and the distance of the object from the camera(s) which capture the stereo images are inversely related. As such, as the distance from the camera(s) increases, the disparity decreases. Consequently, disparity estimation enables depth perception in stereo images. Specifically, using geometry and algebra, pixels in two-dimensional stereo images can be mapped as coordinates in three-dimensional space. Determining depth from two-dimensional images has many uses, not least in the field of navigation.

SUMMARY

In a first aspect, this specification describes a method comprising estimating disparity values for pixels located in an occluded region of a first one of a defocused pair of stereo images using: a first set of blur map data corresponding to the first one of the defocused pair of stereo images; a first set of disparity map data corresponding to the first one of the defocused pair of stereo images; and a first set of occlusion map data corresponding to the first one of the defocused pair of stereo images.

The method may further comprise generating a first set of blur-disparity map data corresponding to the first one of the defocused pair of stereo images, the first set of blur-disparity map data being generated based on: the first set of disparity map data; the first set of occlusion map data; and the first set of blur map data; and estimating the disparity values for the pixels located in the occluded region of the first one of the defocused pair of stereo images using the first set of occlusion map data and the first set of blur-disparity map data.

The method may further comprise updating the first set of disparity map data with the estimated disparity values to generate a first set of updated disparity map data.

The method may further comprise applying at least one filter to the first set of updated disparity map data. Applying the at least one filter may comprise applying a first filter to the first set of updated disparity map data and applying a second filter to the first-filtered first set of updated disparity map data. The first filter may be one of a morphological erosion filter and a morphological dilation filter and the second filter may be the other of the morphological erosion filter and the morphological dilation filter.

Generating the first set of blur-disparity map data may comprise: using the first set of occlusion map data to identify pixels in the first set of disparity map data which correspond to the non-occluded pixels in the first one of the defocused pair of stereo images, each identified pixel in the set of disparity map data having a disparity value; for each different disparity value of the identified pixels: identifying a set of non-occluded pixels in the first set of blur map data, the set of non-occluded pixels in the first set of blur map data corresponding to the identified pixels in the first set of disparity map data which have the different disparity value, each identified non-occluded pixel in the first set of blur map data having a blur value; calculating the mean blur value of the set of non-occluded pixels in the first set of blur map data; and assigning the calculated mean blur value to the pixels in the first set of blur-disparity map data which correspond to the identified set of non-occluded pixels in the first set of blur map data. The method may further comprise, if none of the previously-calculated mean blur values have a contributing pixel having the blur value of an identified occluded pixel in the first set of blur map data, assigning to the occluded pixel in the first set of blur-disparity map data, which corresponds to the identified occluded pixel, the mean blur value which is closest to the blur value of the identified occluded pixel.

Each pixel in the first set of blur-disparity map data may have an associated mean blur value, and estimating the disparity values for the pixels located in the occluded region of the first one of the defocused pair of stereo images may comprise: using the first set of occlusion map data to identify at least one occluded pixel in the first set of blur-disparity map data; for each occluded pixel in the first set of blur-disparity map data: calculating a combined difference between the mean blur value of the occluded pixel and the mean blur value of each non-occluded pixel in the first set of blur-disparity map data within an M×N neighbourhood of the occluded pixel; for each mean blur value within the M×N neighbourhood, calculating the mean blur difference; and identifying the mean blur value having the lowest mean blur difference, wherein the estimated disparity value for the occluded pixel is the disparity value which corresponds to the mean blur value having the lowest mean blur difference. The combined difference may be a weighted average of the absolute difference between the mean blur value of the occluded pixel and the mean blur value of the non-occluded pixel and the geometric Euclidian distance between occluded pixel and the non-occluded pixel. The mean blur difference for each mean blur value within the M×N neighbourhood may be calculated by summing the combined differences of all the non-occluded pixels having the mean blur value and normalising the result by the total number of the non-occluded pixels having the mean blur value.

The method may further comprise generating the first set of disparity map data using the pair of stereo images. Generating the first set of disparity map data may comprise stereo matching the pair of stereo images.

The method may further comprise generating the first set of occlusion map data using the first one of the defocused pair of stereo images and the first set of disparity map data. Generating the first occlusion map data may comprise: transforming pixels of the first one of the defocused pair of stereo images in accordance with the first set of disparity map data and processing the resulting image by setting each pixel in the resulting image which has at least one pixel from the first stereo image to a first value indicating a non-occluded pixel and setting each pixel which has no pixels from the first stereo image to a second value indicating an occluded pixel.

The method may further comprise generating the first set of blur map data using the first one of the defocused pair of stereo images. Generating the first set of blur map data may comprise applying a depth-from-defocus technique to the first one of the defocused the pair of stereo images.

The method may further comprise: estimating disparity values for pixels located in an occluded region of a second one of a defocused pair of stereo images using: a second set of blur map data corresponding to the second one of the defocused pair of stereo images; a second set of disparity map data corresponding to the second one of the defocused pair of stereo images; and a second set of occlusion map data corresponding to the second one of the defocused pair of stereo images. The method may further comprise: generating a second set of blur-disparity map data corresponding to the second one of the defocused pair of stereo images, the second set of blur-disparity map data being generated based on: the second set of disparity map data; the second set of occlusion map data; and the second set of blur map data; estimating the disparity values for the pixels located in the occluded region of the second one of the defocused pair of stereo images using the second set of occlusion map data and the second set of blur-disparity map data. The method may further comprise updating the second set of disparity map data with the estimated disparity values for pixels located in the occluded region of the second one of the defocused pair of stereo images, to generate a second set of updated disparity map data. The method may further comprise applying at least one filter to the second set of updated disparity map data. The method may further comprise: applying a first filter to the second set of updated disparity map data; and applying a second filter to the first-filtered second set of updated disparity map data. The first filter may be one of a morphological erosion filter and a morphological dilation filter and the second filter may be the other of the morphological erosion filter and the morphological dilation filter.

In a second aspect, this specification describes an apparatus comprising: at least one processor; and at least one memory including computer program code, the at least one memory and the computer program code configured to, with the at least one processor, cause the apparatus at least to: estimate disparity values for pixels located in an occluded region of a first one of a defocused pair of stereo images using: a first set of blur map data corresponding to the first one of the defocused pair of stereo images; a first set of disparity map data corresponding to the first one of the defocused pair of stereo images; and a first set of occlusion map data corresponding to the first one of the defocused pair of stereo images.

The at least one memory and the computer program code may be configured to, with the at least one processor, cause the apparatus to: generate a first set of blur-disparity map data corresponding to the first one of the defocused pair of stereo images, the first set of blur-disparity map data being generated based on: the first set of disparity map data; the first set of occlusion map data; and the first set of blur map data; and estimate the disparity values for the pixels located in the occluded region of the first one of the defocused pair of stereo images using the first set of occlusion map data and the first set of blur-disparity map data.

The at least one memory and the computer program code may be configured to, with the at least one processor, cause the apparatus to: update the first set of disparity map data with the estimated disparity values to generate a first set of updated disparity map data. The at least one memory and the computer program code may be configured to, with the at least one processor, cause the apparatus to: apply at least one filter to the first set of updated disparity map data. The at least one memory and the computer program code may be configured to, with the at least one processor, cause the apparatus to: apply a first filter to the first set of updated disparity map data; and apply a second filter to the first-filtered first set of updated disparity map data. The first filter may be one of a morphological erosion filter and a morphological dilation filter and the second filter may be the other of the morphological erosion filter and the morphological dilation filter.

The at least one memory and the computer program code may be configured to, with the at least one processor, cause the apparatus to generate the first set of blur-disparity map data by: using the first set of occlusion map data to identify pixels in the first set of disparity map data which correspond to the non-occluded pixels in the first one of the defocused pair of stereo images, each identified pixel in the set of disparity map data having a disparity value; for each different disparity value of the identified pixels: identifying a set of non-occluded pixels in the first set of blur map data, the set of non-occluded pixels in the first set of blur map data corresponding to the identified pixels in the first set of disparity map data which have the different disparity value, each identified non-occluded pixel in the first set of blur map data having a blur value; calculating the mean blur value of the set of non-occluded pixels in the first set of blur map data; and assigning the calculated mean blur value to the pixels in the first set of blur-disparity map data which correspond to the identified set of non-occluded pixels in the first set of blur map data. The at least one memory and the computer program code may be configured to, with the at least one processor, cause the apparatus to, if none of the previously-calculated mean blur values have a contributing pixel having the blur value of an identified occluded pixel in the first set of blur map data, assign to the occluded pixel in the first set of blur-disparity map data, which corresponds to the identified occluded pixel, the mean blur value which is closest to the blur value of the identified occluded pixel.

Each pixel in the first set of blur-disparity map data may have an associated mean blur value, and wherein the at least one memory and the computer program code may be configured to, with the at least one processor, cause the apparatus to estimate the disparity values for the pixels located in the occluded region of the first one of the defocused pair of stereo images by: using the first set of occlusion map data to identify at least one occluded pixel in the first set of blur-disparity map data; for each occluded pixel in the first set of blur-disparity map data: calculating a combined difference between the mean blur value of the occluded pixel and the mean blur value of each non-occluded pixel in the first set of blur-disparity map data within an M×N neighbourhood of the occluded pixel; for each mean blur value within the M×N neighbourhood, calculating the mean blur difference; and identifying the mean blur value having the lowest mean blur difference, wherein the estimated disparity value for the occluded pixel is the disparity value which corresponds to the mean blur value having the lowest mean blur difference. The combined difference may be a weighted average of the absolute difference between the mean blur value of the occluded pixel and the mean blur value of the non-occluded pixel and the geometric Euclidian distance between occluded pixel and the non-occluded pixel. The at least one memory and the computer program code may be configured to, with the at least one processor, cause the apparatus to: calculate the mean blur difference for each mean blur value within the M×N neighbourhood by summing the combined differences of all the non-occluded pixels having the mean blur value and normalising the result by the total number of the non-occluded pixels having the mean blur value.

The at least one memory and the computer program code may be configured to, with the at least one processor, cause the apparatus to generate the first set of disparity map data using the pair of stereo images.

The at least one memory and the computer program code may be configured to, with the at least one processor, cause the apparatus to generate the first set of occlusion map data using the first one of the defocused pair of stereo images and the first set of disparity map data.

The at least one memory and the computer program code may be configured to, with the at least one processor, cause the apparatus to generate the first set of blur map data using the first one of the defocused pair of stereo images.

The at least one memory and the computer program code may be configured to, with the at least one processor, cause the apparatus to estimate disparity values for pixels located in an occluded region of a second one of a defocused pair of stereo images using: a second set of blur map data corresponding to the second one of the defocused pair of stereo images; a second set of disparity map data corresponding to the second one of the defocused pair of stereo images; and a second set of occlusion map data corresponding to the second one of the defocused pair of stereo images. The at least one memory and the computer program code may be configured to, with the at least one processor, cause the apparatus to generate a second set of blur-disparity map data corresponding to the second one of the defocused pair of stereo images, the second set of blur-disparity map data being generated based on: the second set of disparity map data; the second set of occlusion map data; and the second set of blur map data; estimate the disparity values for the pixels located in the occluded region of the second one of the defocused pair of stereo images using the second set of occlusion map data and the second set of blur-disparity map data. The at least one memory and the computer program code may be configured to, with the at least one processor, cause the apparatus to: update the second set of disparity map data with the estimated disparity values for pixels located in the occluded region of the second one of the defocused pair of stereo images to generate a second set of updated disparity map data. The at least one memory and the computer program code may be configured to, with the at least one processor, cause the apparatus to: apply at least one filter to the second set of updated disparity map data. The at least one memory and the computer program code may be configured to, with the at least one processor, cause the apparatus to: apply a first filter to the second set of updated disparity map data; and apply a second filter to the first-filtered second set of updated disparity map data. The first filter may be one of a morphological erosion filter and a morphological dilation filter and the second filter may be the other of the morphological erosion filter and the morphological dilation filter.

In a third aspect, this specification describes a non-transitory computer-readable storage medium having stored thereon computer-readable code, which, when executed by computing apparatus, causes the computing apparatus to perform a method comprising: estimating disparity values for pixels located in an occluded region of a first one of a defocused pair of stereo images using: a first set of blur map data corresponding to the first one of the defocused pair of stereo images; a first set of disparity map data corresponding to the first one of the defocused pair of stereo images; and a first set of occlusion map data corresponding to the first one of the defocused pair of stereo images. The non-transitory computer-readable storage medium may additionally have stored thereon computer-readable code which, when executed causes the computer apparatus to perform any of the steps described with reference to the method of the first aspect.

In a fourth aspect, this specification describes computer-readable code, which when executed by computing apparatus causes the computing apparatus to perform any method as described with reference to the first aspect.

In a fifth aspect, this specification describes apparatus comprising: means for estimating disparity values for pixels located in an occluded region of a first one of a defocused pair of stereo images using: a first set of blur map data corresponding to the first one of the defocused pair of stereo images; a first set of disparity map data corresponding to the first one of the defocused pair of stereo images; and a first set of occlusion map data corresponding to the first one of the defocused pair of stereo images. The apparatus according to the fifth aspect may further comprise means for performing any of the operations described with reference to the first aspect.

BRIEF DESCRIPTION OF THE FIGURES

For a more complete understanding of examples of embodiments of the invention, reference is now made to the following description taken in connection with the accompanying drawings in which.

DETAILED DESCRIPTION OF EXAMPLES OF EMBODIMENTS

Figure 1:
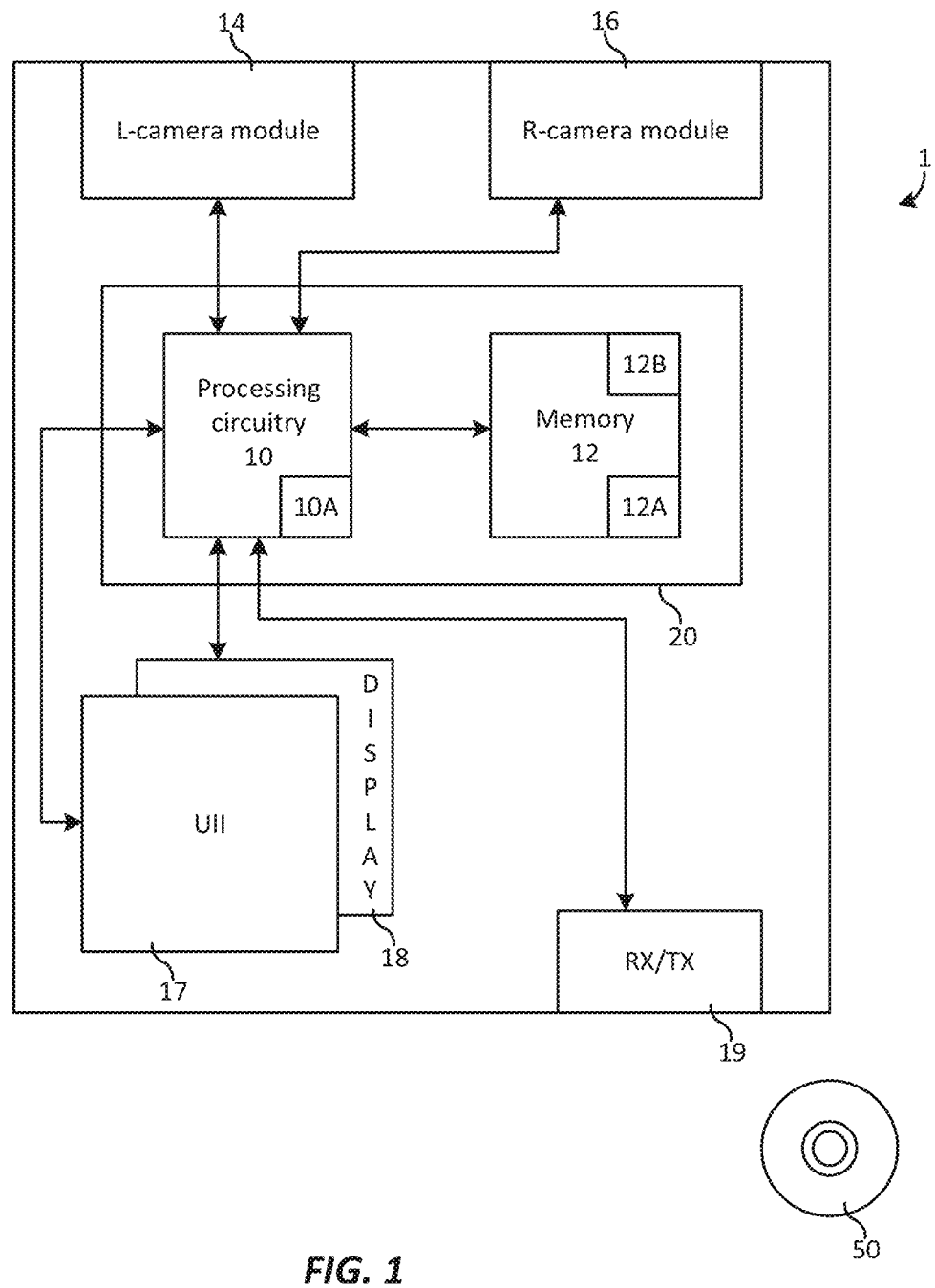
FIG. 1 is a schematic illustration of an apparatus which may perform operations according to examples of embodiments of the invention.

The following description and the drawings relate to provision of improved methods and apparatuses for image processing and analysis. In the description and drawings, like reference numerals refer to like elements throughout.

FIG. 1 is a schematic block diagram of an exemplary electronic device 1 or apparatus 1, which incorporates image processing apparatus 20 for providing improved image processing functionality.

The electronic device 1 is, in some embodiments, a portable electronic device, or more specifically, a portable image capture device. For instance the electronic device may be but is not limited to a tablet computer, a mobile phone, a media player, a PDA and a dedicated camera.

The electronic device 1 comprises image processing apparatus 20. The image processing apparatus 20 comprises processing circuitry 10 and at least one non-transitory computer readable memory medium 12. The processing circuitry 10 and the memory 12 may be coupled/connected to one another such that the processing circuitry can read data from and write data to the memory 12.

The processing circuitry 10 may be any type of processing circuitry. For example, the processing circuitry 10 may comprise one or more programmable processor 10A that interprets computer program instructions and processes data. Alternatively or additionally, the processing circuitry 10 may comprise, for example, programmable hardware with embedded firmware. The processing circuitry 10 may be termed processing means or means for processing.

The at least one non-transitory computer readable memory medium 12 has stored therein computer program instructions 12A which may provide the logic and routines that enables the image processing apparatus 20 to perform the functionality described below with reference to FIGS. 2 to 6. The computer program instructions 117, 127 may be pre-programmed into the image processing apparatus 20. Alternatively, they may arrive at the image processing apparatus 20 via an electromagnetic carrier signal or be copied from a physical entity such as a non-transitory computer-readable memory medium 50. Examples of such a non-transitory computer-readable memory medium 50 (which may be referred to as a computer program product) include a non-volatile electronic memory device (e.g. flash memory) and a record medium such as a CD-ROM or DVD.

The memory 12 may comprise both volatile memory and non-volatile memory. The computer program instructions 12A are typically, stored in the non-volatile memory and are executed by the processing circuitry using the volatile memory for temporary storage of data 12B. Examples of volatile memory include RAM, DRAM, SDRAM etc. Examples of non-volatile memory include ROM, PROM, EEPROM, flash memory, optical storage, magnetic storage, etc.

The image processing apparatus 20 may be a single integrated circuit. It may alternatively be provided as a set of integrated circuits (i.e. a chipset). The image processing apparatus 20 may alternatively be a hardwired, application-specific integrated circuit (ASIC). The image processing apparatus 20 may, in some embodiments, form part of a master controller of a device or apparatus which performs other functions which are not related to image processing.

The electronic device 1 may, in some embodiments, comprise first and second camera modules 14, 16 configured to capture a pair of stereo images. The first camera module 14 may be referred to as the left camera module and the second camera module 16 may be referred to as the right camera module. The camera modules 14, 16 may be physically configured side-by-side so as to simulate human binocular vision. Together they may be referred to as a stereo camera. The distance between the lenses of each camera module (the intra-axial distance) may be, for example, the distance between an average person's eyes (known as the intra-ocular distance), which is about 6.35 cm. Alternatively, the camera modules may be configured to have a greater or lesser intra-axial distance.

Figure 5B:
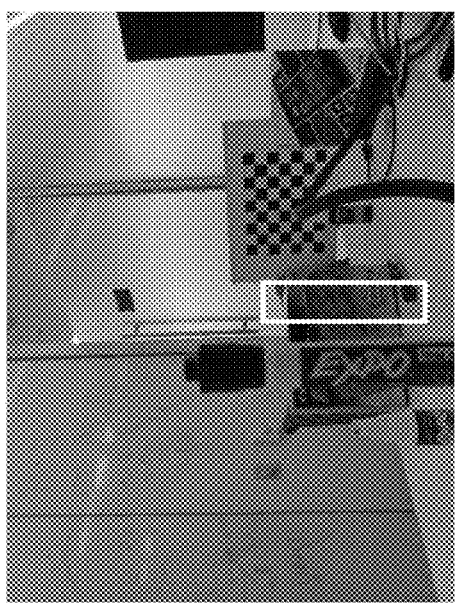
FIGS. 5A to 5J are images depicting outputs of various ones of the operations illustrated in FIG. 4.
Figure 5D:
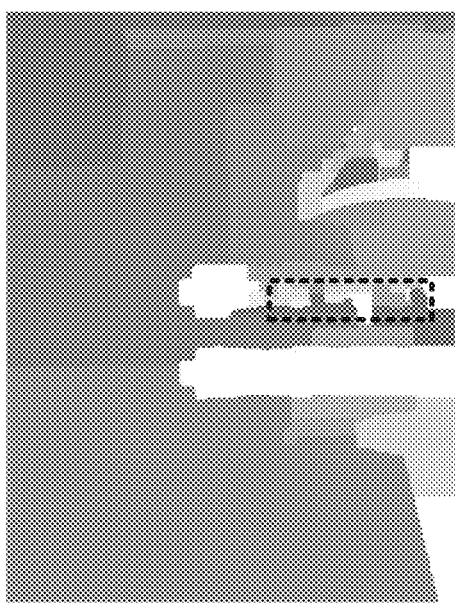
Figure 5A:
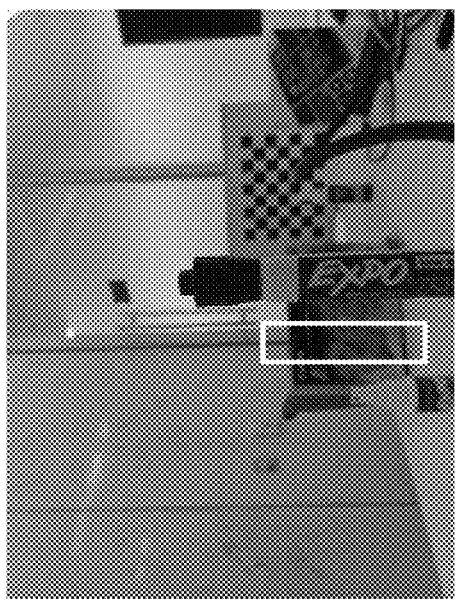

FIGS. 5A and 5B show two images of the same scene, each of which has been captured by a different one of a pair of stereoscopically-configured camera modules, such as those 14, 16 of FIG. 1. Specifically, the image of FIG. 5A has been captured by a left camera module 14 and the image of FIG. 5B has been captured by a right camera module 16. As can be seen from FIGS. 5A and 5B, foreground objects in right stereo image of FIG. 5B appear closer to the left-hand edge of the image than they do in the left stereo image of FIG. 5A. Conversely, foreground objects in the left stereo image appear closer to the right-hand edge of the image than they do in the right stereo image. This difference between the locations of objects in each of a pair of stereo images is known as disparity.

Returning now to FIG. 1, each of the camera modules 14, 16 are configured to provide image data representative of their respective image to the image processing apparatus 20. More specifically, the first, or left, camera module 14 is configured to provide first or left stereo image data $I_L$ and the second, or right, camera module 16 is configured to provide second or left image data $I_R$.

The camera modules 14, 16 may be operable under the control of the image processing apparatus 20, which may control the operation of the camera module 14, 16. For instance, the image processing apparatus 20 may control the camera modules to capture their respective images. In other examples, the camera modules 14, 16 may be operable under the control of a different controller, such as a master controller of the electronic device 1 (not shown).

The lens position of the camera modules 14, 16 may be individually controllable such that the lens of each camera module can be set to a different position. Alternatively, the lens position of the camera modules 14, 16 may not be controllable but may be fixed at respective different values. The effect of each camera module 14, 16 having a different lens position is discussed in more detail below. The lens position of each camera module 14, 16 may be un-calibrated or unknown.

In this specific example, the electronic device 1 further comprises a display 18 and a user input interface 17 (UII). The display 18 may be operable to output images to a user. Such images may include the images captured by the camera modules 14, 16 and or other image data provided by the image processing apparatus 20. The display 18 may operate under the control of the processing circuitry 10 of the image processing apparatus 20 or a different controller (not shown) such as a master controller of the device 1.

The UII 17 is configured to respond to inputs received by the user and to output signals indicative of these. These signals may be provided to the processing circuitry 10 of the image processing apparatus 20, which may perform operations in accordance with the inputs. Alternatively, the signals may be provided to a master controller 10 (not shown) which controls other components of the device 1 accordingly. The UII 17 may be of any suitable type. For instance, the UII 17, may be a touch-sensitive device which may be overlaid on the display 18 to form a touchscreen.

The electronic device 1, in this example, further comprises a transceiver (RX/TX) 19. The transceiver 19 enables communication with other electronic devices, for example via a wireless communication network. The transceiver 19 may be operable under the control of the image processing apparatus 20 or any other controller 10. The transceiver 19 may be operable to transmit data, such as image data, that is output by the image processing apparatus 20. Similarly, the transceiver 19 may be configured to provide received data to the image processing apparatus 20.

Figure 2:
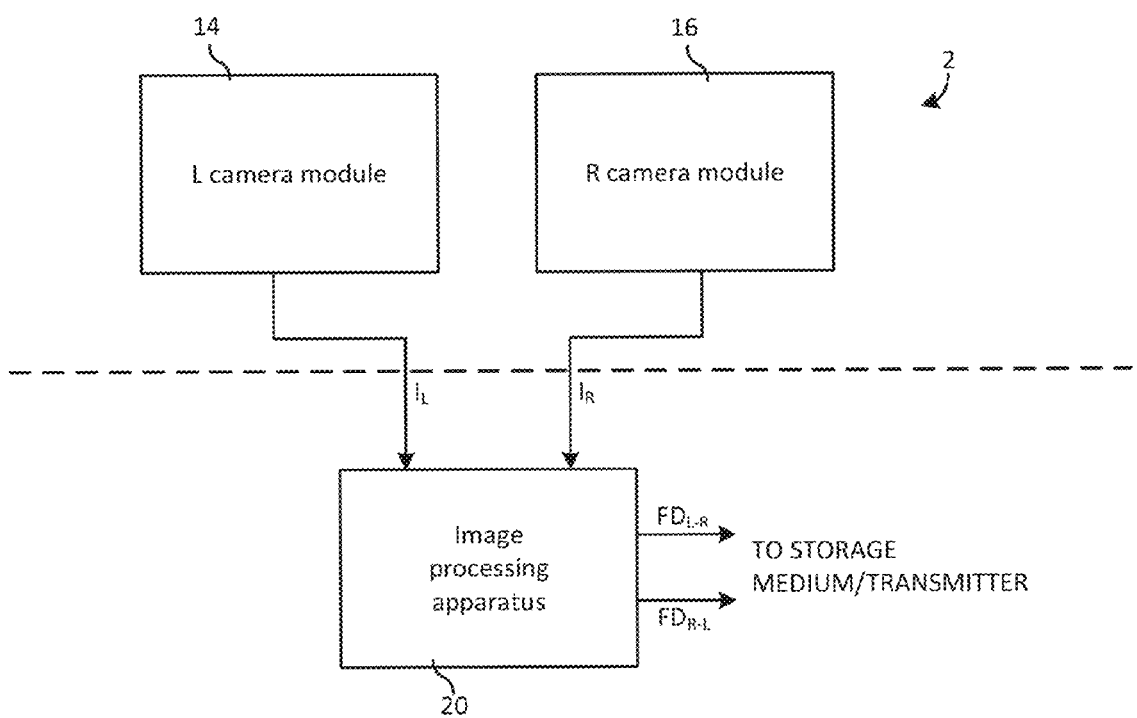
FIG. 2 is a schematic illustration of an image capture and processing apparatus which may perform operations according to examples of embodiments of the invention.

FIG. 2 shows a schematic configuration view of an image processing system 2 (which may be part of the electronic device 1 of FIG. 1) including the image processing apparatus 20 and the left and right camera modules 14, 16 for generating the left and right image data $I_L$, $I_R$. In other embodiments, the image processing system 2 may comprise only the image processing apparatus 20 and the left and right image data $I_L$, $I_R$ may be received from an external source, for instance from a network via the transceiver 19 (not shown in FIG. 2) or from an external computer-readable memory medium 50 such as that shown in FIG. 1. An output of the image processing apparatus 20 may be sent to a memory medium (e.g. medium 50 shown in FIG. 1) for storage or to the transceiver 19 (or simply a transmitter) for transmission to another apparatus via a network.

Figure 3:
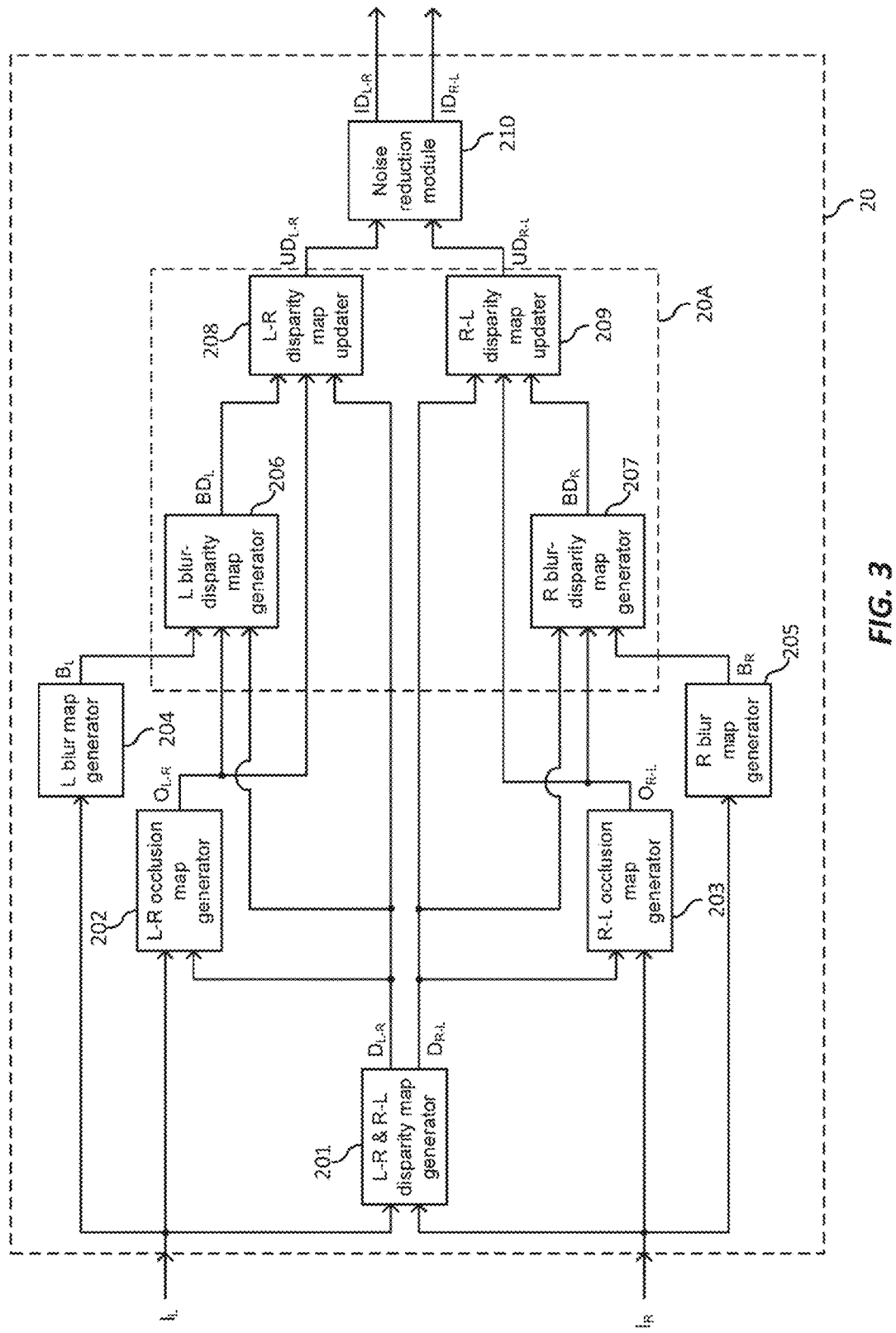
FIG. 3 shows schematically an image processing apparatus according to some examples of embodiments of the invention.

FIG. 3 is a schematic illustration of various image processing functions/operations which may be performed by the image processing apparatus 20 of FIGS. 1 and 2. In some embodiments, the various functions/operations may be performed by one or more portions of computer-readable instructions 12A stored in the memory 12 and executed by the processing circuitry 10.

The inputs to the image processing apparatus 20 are, in this example, left stereo image data $I_L$ and right stereo image data $I_R$. The left stereo image data $I_L$ is representative of an image captured by the leftmost of two camera modules, such as the left and right camera modules 14, 16 depicted in FIGS. 1 and 2, which are configured to capture stereo images. Similarly, the right stereo image data $I_R$ is representative of an image captured by the rightmost of two camera modules. An example of a left image is shown in FIG. 5A, with the corresponding right image being shown in FIG. 5B.

The left and right stereo images are asymmetrically defocused. Put another way, the cameras 14, 16 used to capture the left and right stereo image data $I_L$, $I_R$ are configured to have different focuses because of different lens positions of the two camera modules. As such, one of the stereo images (in the example of FIGS. 5A and 5B, the left stereo image) is focused on the foreground and the other image (in the example of FIGS. 5A and 5B, the right stereo image) is focused on the background. This can be seen in FIGS. 5A and 5B in which the marker pen in the foreground is in focus in the left stereo image of FIG. 5A and the chess board in the background is in focus in right stereo image of FIG. 5B. Such asymmetrically defocused stereo images may be referred to as a "defocused stereo image pair".

The focal length and/or focus setting (lens position) associated with each of the stereo images may be uncalibrated (or unknown). This is because the embodiments described herein associate the blur level associated with an object in an image with its stereo disparity. As mentioned above, the disparity of an object in an image is related to its distance from the camera and as such, embodiments described herein enable a relationship between the blur level and the distance from the camera to be determined.

Although it has been described that the left and right image data $I_L$, $I_R$ is captured using two different camera modules 14, 16, this may not be the case. In other embodiments, the first and second image data $I_L$, $I_R$ may be captured by a single camera module whose location and orientation are adjusted between capture operations. The rotation and translation of the camera may then be recovered, and the images rectified, thereby to simulate a stereo camera configuration. For instance, the image capture could be carried out using existing smart phones or tablet computers which have only a single camera module facing in a particular direction.

The images originally captured by the one or more camera modules 14, 16 may have undergone some pre-processing in order to produce the left and right stereo images. For instance, rectification may have been applied to the captured images in order to produce the stereo image pair which is acquired by the image processing apparatus 20. This may be particularly useful when the images are captured using a single camera module as it is more likely that the captured images may not be entirely horizontally aligned.

As can be seen from the left and right images of FIGS. 5A and 5B, there are certain regions of each image which are not visible in the other image. This is because foreground objects obscure different regions of the background in each image. These regions, which only appear in a single one of the stereo images are known as "occlusion" or "occluded" regions (or "single-occluded" regions), which are made up of one or more occluded pixels. For illustrative purposes, one occluded region in each image has been highlighted using white rectangles.

As will be understood from the below explanation, existing techniques for estimating the disparity of stereo images do not produce good results in occlusion regions. This is because, in the occlusion regions, there is no pixel correspondence between the stereo images.

Returning now to FIG. 3, in this example, the processing apparatus 20 comprises a disparity map generator 201 (which may also be referred to as a disparity map generation function or means for generating a disparity map). The disparity map generator 201 is configured to receive and process the left and right stereo image data $I_L$, $I_R$ and to output data sets representative of first and second disparity maps $D_{L-R}$, $D_{R-L}$. For reasons which will be understood from the below discussion, the first disparity map may be referred to as a "left-to-right" (or simply "left") disparity map and the second disparity map may be referred to as a "right-to-left" (or simply "right") disparity map.

The disparity map generator 201 may be configured to generate the disparity map data $D_{L-R}$, $D_{R-L}$ by applying a technique known as "stereo matching". Any known stereo matching technique may be used. However, when such known techniques are used to generate the disparity map data $D_{L-R}$, $D_{R-L}$, the disparity map generator 201 may be configured to treat the left and right images as being "all-in-focus", even though this is not actually the case.

The stereo matching performed by the disparity map generator 201 may comprise, for each pixel in one of the images, identifying all possible corresponding pixels in the other image and then determining which one of the possible corresponding pixels in the other image is the best match for the pixel under consideration. The displacement between the location of the pixel under consideration and the location of the best matching pixel in the other image is then calculated. The disparity map data $D_{L-R}$, $D_{R-L}$ comprises, for each pixel in each image, a value indicative of the displacement between the pixel and the best matching pixel in the other image.

The left-to-right disparity map data $D_{L-R}$ comprises, for each pixel in the left stereo image, a value of the displacement (or disparity) between the pixel in the left stereo image and the best matching pixel in the right stereo image. The right-to-left disparity map data $D_{R-L}$ comprises, for each pixel in the right stereo image, a value of the displacement (or disparity) between the pixel in the right stereo image and the best matching pixel in the left stereo image.

Figure 5C:
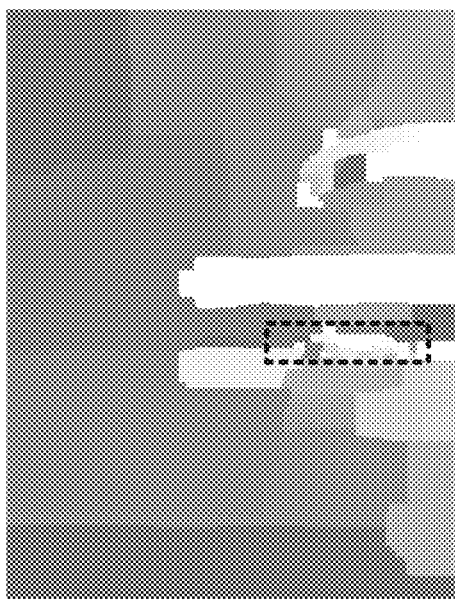

FIG. 5C shows an example of a left-to-right disparity map calculated using the left and right stereo images of FIGS. 5A and 5B and FIG. 5D shows an example of the corresponding right-to-left disparity map. In these disparity maps, the lighter shades of grey represent larger disparity (or displacements).

Ideally, in the non-occlusion regions, each pixel from one image has one, and only one, corresponding pixel in the other image. In contrast, occlusion regions of an image are constituted by pixels which do not have a corresponding pixel in the other image (i.e. occluded pixels). However, because the disparity map generator 201 does not know the location of the occlusion regions when it performs the stereo matching, it nonetheless identifies the best matching pixels for those occluded pixels in the occlusion region. This can result in a wide range of, mostly incorrect, disparities being determined for the pixels in the regions of the disparity maps which correspond to the occlusion regions of the stereo images. This can be seen in FIGS. 5C and 5D in which there are pixels of a number of different shades (i.e. different disparities) within the regions of the disparity maps which correspond to the occlusion regions in the left and right images. For simplicity, the regions in the disparity maps (and indeed in the below-discussed blur maps, occlusion maps, and blur-disparity maps) which correspond to occlusion regions in the left and right stereo images may also be referred to as occlusion regions, with the pixels therein also being referred to as occluded pixels. Examples of occlusion regions are denoted in the disparity maps of FIGS. 5C and 5D using dashed rectangles.

Although the disparity map generator 201 may be configured, as described above, to assume the stereo images are "all-in-focus", it may in other examples be configured to use a disparity estimation approach which takes into account the fact that the stereo images are asymmetrically focused. In such examples, the disparity map generator 201 may be configured to estimate disparity using an approach such as that described in "Dual-focus stereo imaging" by F. Li, J. Sun, J. Wang, and J. Yu (J. Electron. Imaging. 19(4), 043009, Feb. 9, 2010, Jul. 26, 2010, Aug. 30, 2010, Dec. 6, 2010).

The image processing apparatus 20 in the example of FIG. 3 comprises first and second occlusion map generators 202, 203. The first occlusion map generator 202 is configured to receive the first (or left) stereo image data $I_L$ and the first (or left-to-right) disparity map data $D_{L-R}$ and to output data representative of the first (or left-to-right) occlusion map $O_{L-R}$. The first occlusion map generator 202 may be referred to as the "left-to-right occlusion map generator".

The second occlusion map generator 203 is configured to receive the second (or right) stereo image data $I_R$ and the second (or right-to-left) disparity map data $D_{R-L}$ and to output data representative of the second (or right-to-left) occlusion map $O_{R-L}$. The second occlusion map generator 203 may be referred to as the "right-to-left occlusion map generator".

Figure 5F:
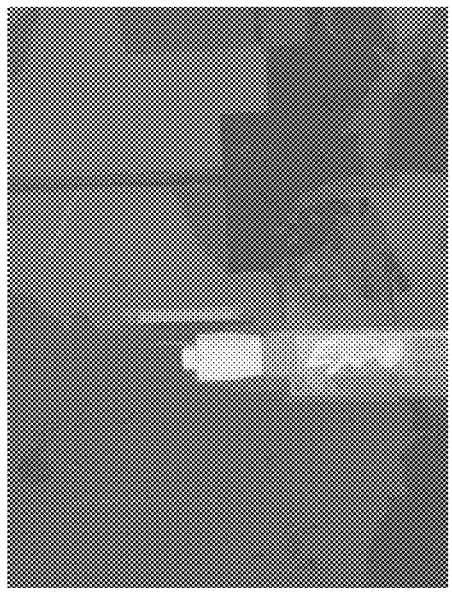

The occlusion map data corresponding to a one of the stereo images comprises, for each pixel in that image, a value which indicates whether or not the pixel has a corresponding pixel in the other stereo image. More specifically, each occlusion map is a binary image in which the first value is assigned to pixels in non-occlusion regions and in which the second value is assigned to pixels in the occlusion regions. Put another way, the value of each pixel in an occlusion map indicates whether or not that pixel is an occluded pixel. An example of an occlusion map is illustrated in FIG. 5E, with the white regions representing the occlusion regions and the black regions representing the non-occlusion regions. The occlusion map of FIG. 5E is the right-to-left (or simply right) occlusion map and so is generated by the right-to-left occlusion map generator 202 on the basis of the data $I_R$ representative of the right stereo image and the data $D_{R-L}$ representative of the right-to-left disparity map. In a right-to-left occlusion map, such as that of FIG. 5E, pixels of the second value (in this example, the white pixels) indicate pixels in the right stereo image, which do not have a corresponding pixel in the left stereo image. Similarly, in a left-to-right occlusion map, pixels of the second value would indicate pixels in the original left stereo image, which do not have a corresponding pixel in the right stereo image.

Each occlusion map generator 202, 203 is configured to generate the occlusion map data $O_{L-R}$, $O_{R-L}$ by transforming each pixel in the received stereo image in accordance with the disparity value of the corresponding pixel in the received disparity map. In the resulting image (i.e. the image that is produced following transformation of each pixel from the received stereo image), those pixels at locations onto which one or more pixels from the received stereo image have been transformed are set to the first value (i.e. to indicate that they are non-occluded pixels) and those pixels at locations onto which none of the pixels of the received stereo image are transformed are set to the second value (i.e. to indicate that they are occluded pixels). The post-transformation processing that is applied may, for example, be expressed as follows:

$O(x,y)=0$ (zero) if pixel $(x,y)$ has at least one source pixel following the transformation; and $O(x,y)=1$ (one) if pixel $(x,y)$ has no source pixels following the transformation, where $O(x,y)$ is the pixel at location x, y in the occlusion map.

As will be appreciated from the above, the left-to-right occlusion map generator 202 is configured to transform each pixel from the left image in accordance with the disparity value of the corresponding pixel of the left-to-right disparity map and then to perform the above-described post-transformation processing. Similarly, the right-to-left occlusion map generator 203 is configured to perform the above-described post-transformation processing after transforming each pixel from the right stereo image in accordance with the disparity value of the corresponding pixel of the right-to-left disparity map.

The image processing apparatus may further comprise first and second blur map generators 204, 205. The blur map generators 204, 205 are together configured to receive the data $I_L$, $I_R$ representative of the defocused stereo image pair and to out put a pair of blur maps, one corresponding to each of the stereo images. Specifically, the first blur map generator 204 is configured to receive the first (or left) stereo image data $I_L$ and to output data representative of the first (or left) blur map $B_L$. The second blur map generator 205 is configured to receive the second (or right) stereo image data $I_R$ and to output data representative of the second (or right) blur map $B_R$.

The blur map generators 204, 205 may be configured to generate the blur maps using any known "depth-from-defocus" technique. For example, one of the techniques described in "Learning to Estimate and Remove Non-uniform Image Blur" (2013 IEEE Conference on Computer Vision and Pattern Recognition) by F. Couzinie-Devy, J. Sun; K. Alahari and J. Ponce, or "Absolute Depth Estimation from a Single Defocused Image" (IEEE Transactions on Image Processing, Volume 22, Issue ii) by J. Lin, X. Ji, W. Xu, and Q. Dai, which are hereby incorporated by reference, may be used In the resultant sets of blur map data $B_L$, $B_R$, the value for each pixel is dependent on the measured blur associated with that pixel. Put another way, the blur map data corresponding to a one of the stereo images comprises, for each pixel in that image, a value which indicates the level of blur (or the blur value) associated with that pixel. FIG. 5F shows an example of the blur map for the right stereo image of FIG. 5B. In this example, the darker the pixel, the higher the blur value associated with that pixel.

The image processing apparatus 20 comprises first and second blur-disparity map generators 206, 207. The first and second blur-disparity map generators 206, 207 are configured to output first and second sets of blur-disparity map data $BD_L$, $BD_R$, each set corresponding to a different one of the stereo images. In general terms, the blur disparity map data for a one of the stereo images comprises, for each pixel of the stereo image, a mean blur value which is determined based the disparity value of the pixel The first blur-disparity map generator 206 is configured to receive the first (or left) blur map data $B_L$, the first (or left-to-right) disparity map data $D_{L-R}$ and the first (or left-to-right) occlusion map data $O_{L-R}$ and to generate, based on the received data sets, data $BD_L$ representative of a first (or left) blur-disparity map. The first blur-disparity map generator 206 may be referred to as the "left blur-disparity map generator".

The second blur-disparity map generator 207 is configured to receive the second (or right) blur map data $B_R$, the second (or right-to-left) disparity map data $D_{R-L}$ and the second (or right-to-left) occlusion map data $O_{R-L}$ and to generate, based on the received data sets, data $BD_R$ representative of a second (or right) blur-disparity map. The second blur-disparity map generator 207 may be referred to as the "right blur-disparity map generator".

A theoretical relationship exists between the blur and disparity of pixels of a defocused stereo image pair. This theoretical relationship can be derived from the well-known thin lens model and the disparity model and is as set out in Equation, 1 below. "Dual-focus stereo imaging" by F. Li, J. Sun, J. Wang, and J. Yu (J. Electron. Imaging. 19(4)) and "Depth estimation and image restoration using defocused stereo pairs," by A. N. Rajagopalan, S. Chaudhuri, and U. Mudenagudi, (IEEE Transactions on Pattern Analysis and Machine Intelligence, vol. 26, no. 11, pp. 1521-1525, 2004) are both relevant to the derivation of this equation.

$$b=D|\gamma_p-\gamma|/(B-\gamma) \quad \text{(Equation 1)}$$

where
 b=blur radius for a specific pixel;
 $\gamma_p$=disparity for the corresponding pixel in the defocused stereo image (e.g. $I_L$);
 $\gamma$=disparity for a corresponding pixel in a theoretical "all-in-focus" image;
 D is a function of the camera module focal length and aperture; and
 B is a function of the stereo baseline and intrinsic parameters.

Figure 6:
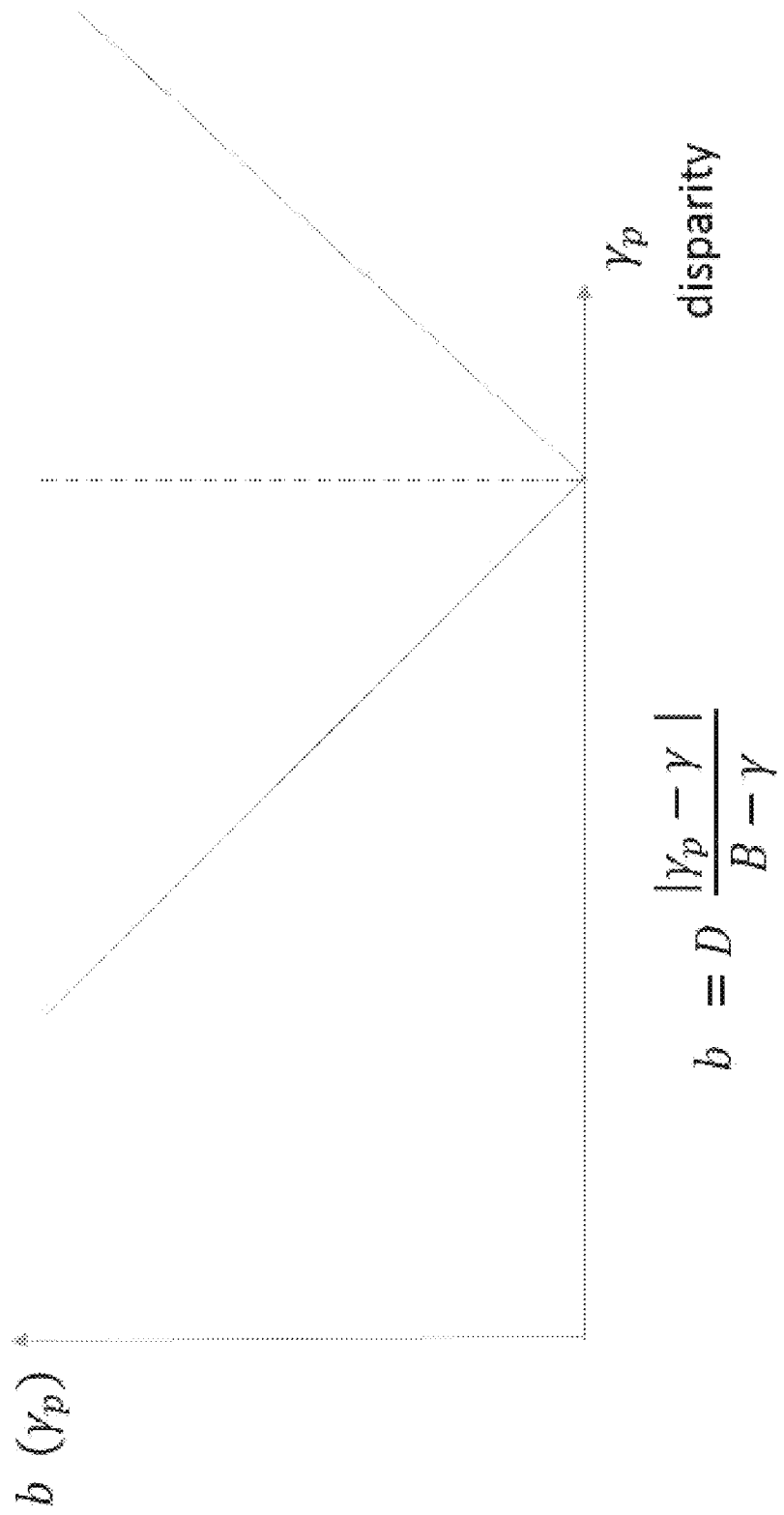
FIG. 6 is a graph showing the theoretical relationship between the blur of a pixel and its disparity.

FIG. 6 is a graph showing this theoretical, piecewise linear relationship between the disparity $\gamma_p$ of a pixel and the blur radius b of that pixel, when B and D are assumed to be constant.

In reality, because of the error in the disparity estimation and noise in the stereo images and the single image blur estimation, the relationship between the blur radius and stereo disparity may not be linear. Consequently, the above theoretical relationship is not used. Instead, the blur-disparity map generators 206, 207 are configured to estimate the blur-disparity mapping in the following way:

Firstly, each blur-disparity map generator 206, 207 is configured to use the received occlusion map data $O_{L-R}$, $O_{R-L}$ to identify the pixels in the occlusion regions (the "occluded pixels") and the pixels outside the occlusion regions (the "non-occluded pixels"). Next, for all the non-occluded pixels in the received disparity map, the blur-disparity map generator 206, 207 is configured to identify all pixels that have the same disparity value. Subsequently, for all pixels having a particular disparity value, the blur-disparity map generator 206, 207 sums the blur values of the corresponding pixels in the received blur map and then divides the total by the number of pixels having that particular disparity value. Put another way, the blur-disparity map generator 206, 207 is configured to calculate the "mean blur" for all non-occluded pixels having the particular disparity value. All non-occluded pixels which contribute towards a particular mean blur value may be referred to as the contributing set of pixels for that mean blur value.

Calculation of the mean blur is repeated for each different disparity value, such that each different disparity value has a corresponding mean blur value. The blur-disparity map generator 206, 207 then generates the non-occlusion regions of the blur disparity map by assigning the corresponding mean blur value to all the pixels which correspond to pixels in the disparity map which have a particular disparity value. It will thus be appreciated that, if two non-occluded pixels in the disparity map have the same disparity, the corresponding pixels in the blur-disparity map will also have the same value, that same value being the mean-blur value corresponding to the disparity.

Figure 5H:
Figure 5E:
Figure 5G:
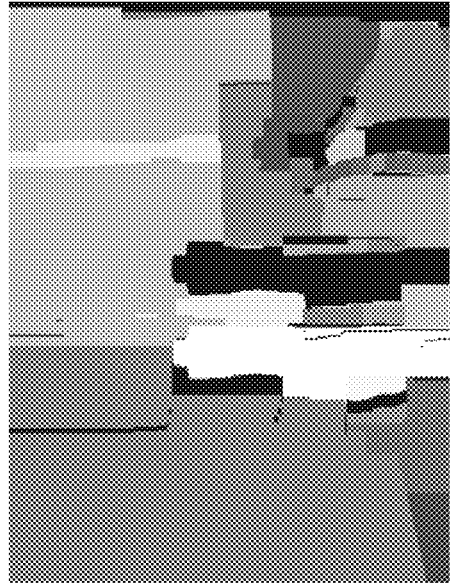
Figure 5J:
Figure 5I:

A partial blur-disparity map for only the non-occluded regions for the right image is shown in FIG. 5G. In this example, the occluded regions are shown in black.

Next, the blur-disparity map generator 206, 207 generates the blur-disparity map pixel values for the occluded pixels.

In some embodiments, this may be performed by identifying from the blur map data $B_L$, $B_R$ the blur value for a particular occluded pixel and then identifying, out of all mean blur values which were previously-calculated for the non-occluded pixels, the mean blur value which is closest or most-similar to the identified blur value. The pixel value for the particular occluded pixel in the blur-disparity map is then set as the identified closest mean blur value. This process is then repeated for all occluded pixels.

However, this approach for generating the blur-disparity map pixel values for the occluded pixels may, in some instances, be suboptimal. This is because each mean blur value is calculated on the basis of many different original blur values, which may be spread over a relatively large range. Consequently, generating the blur-disparity map pixel values for the occluded pixels in this way may produce a noisy result. As such, in some alternative embodiments, the blur-disparity map generator 206, 207 may be configured to generate the blur-disparity map pixel values for the occluded pixels in a different way.

More specifically, the blur-disparity map generator 206, 207 may be configured, when calculating the mean blur values for the non-occluded pixels, to count and store, for each different disparity value, the numbers of pixels which have each different blur value. Put another way, the blur-disparity map generator 206, 207 may determine the numbers of pixels which have each different blur value that contribute towards a particular mean blur. Put yet another way, the blur-disparity map generator 206, 207 may determine the number of pixels in the contributing set of pixels for a mean blur value which have each different blur value.

The blur-disparity map generator 206, 207 then sets the pixel value for a particular occluded pixel in the blur disparity-map as the mean blur value whose contributing set of pixels had the largest number of pixels having the same blur value as the occluded pixel under consideration. This process is then repeated for each occluded pixel until each pixel in the blur-disparity map is assigned a mean blur value.

By way of example, let us consider two different disparities $d_1$ and $d_2$ and let us assume that there are 80 non-occluded pixels having each disparity. For the first disparity $d_1$, there are 10 pixels having a first blur value $b_1$, 50 pixels having a second blur value $b_2$ and 20 pixels having a third blur value $b_3$ and, consequently, the mean blur value for the pixels having first disparity $d_1$ is $M_1=(10b_1+50b_2+20b_3)/80$. For the second disparity $d_2$, there are 40 pixels having the first blur value $b_1$, 30 pixels having the second blur value $b_2$ and 10 pixels having a third blur value $b_3$ and, consequently, the mean blur for the second disparity $d_2$ is $M_2=(40b_1+30b_2+10b_3)/80$.

When the blur-disparity map generator 206, 207 estimates a pixel value for an occluded pixel in the blur-disparity map, the blur value of which is the first blur value $b_1$, it determines which of the first and second mean blur values $M_1$, $M_2$ has the largest number of contributing pixels having the first blur value $b_1$. It then sets the pixel value of the occluded pixel in the blur-disparity map as the determined mean blur value. In this case, there were 10 pixels having the first blur value $b_1$ which contributed to the first mean blur value $M_1$ and 40 pixels having the first blur value $b_1$ which contributed to the second mean blur value $M_2$. As a higher number of pixels having the first blur value $b_1$ contributed to the second mean blur value $M_2$, the value of the occluded pixel in the blur-disparity map is set to the second mean blur value $M_2$.

If none of the mean blur values have, in their contributing set of pixels, a pixel having the same blur value as an occluded pixel, the blur-disparity map generator 206, 207 is configured to assign to the corresponding occluded pixel in the blur-disparity map the mean blur value which is closest to the blur value of the occluded pixel. In terms of the above-described example, let us assume that an occluded pixel in the blur map has a fourth blur value $b_4$. In this case, as neither of the first and second mean blur values $M_1$ and $M_2$ have in their contributing sets a pixel having the fourth blur value $b_4$, the blur-disparity map generator 206, 207 determines which of the mean blur values $M_1$ and $M_2$ is closest, or most similar, to the fourth mean blur value $b_4$. The pixel of the blur-disparity map which corresponds to the pixel in the blur map having the fourth pixel value $b_4$ is then set to the determined closest mean blur value.

FIG. 5H shows the complete blur-disparity map (including the occluded regions) for the right stereo image, the pixel values for the occluded regions of which were estimated using the second-described approach.

The image processing apparatus 20 may further comprise first and second disparity map updaters 208, 209.

The first disparity map updater 208 is configured to receive the first (or left) blur-disparity map data $BD_L$, the first (or left-to-right) disparity map data $D_{L-R}$ and the first (or left-to-right) occlusion map data $O_{L-R}$ and to generate, based on the received data sets, data $UD_{L-R}$ representative of a first (or left-to-right) updated disparity map. The first disparity map updater 208 may be referred to as the "left-to-right disparity map updater".

The second disparity map updater 209 is configured to receive the second (or right) blur-disparity map data $BD_R$, the second (or right-to-left) disparity map data $D_{R-L}$ and the second (or right-to-left) occlusion map data $O_{R-L}$ and to generate, based on the received data sets, data $UD_{R-L}$ representative of a second (or right-to-left) updated disparity map. The second disparity map updater 209 may be referred to as the "right-to-left disparity map updater".

Each disparity map updater 208, 209 is configured to update its respective disparity map as follows:

Firstly, the disparity map updater 208, 209 calculates, using the received blur-disparity map data $BD_L$, $BD_R$, for each occluded pixel op in the blur-disparity map data, a combined difference, CD, between the occluded pixel op and any other non-occluded pixel q within an M×N neighborhood. The combined difference between the occluded pixel op and a non-occluded pixel q is the weighted average of the absolute difference between the mean blur of the occluded pixel op and the mean blur of the non-occluded pixel q and the geometric Euclidian distance of the two pixels. More specifically, the combined difference between an occluded pixel in the blur-disparity map and a non-occluded pixel q within the M×N neighbourhood may be determined using the following equation:

$$CD = \frac{1}{(a+b)}\Big(a \times |MeanBlur(op) - MeanBlur(q)| + b \times \sqrt{[x(op)-x(q)]^2 + [y(op)-y(q)]^2}\,\Big) \quad \text{(Equation 2)}$$

where:
  a and b are pre-defined constants for weighting;
  x(op), y(op) are coordinates of the occluded pixel op; and
  x(q), y(q) are coordinates of the non-occluded pixel q.

Next, for each possible mean blur value within the M×N neighbourhood of the occluded pixel op, the disparity map updater 208, 209 calculates a corresponding mean blur difference, MBD (or mean combined difference). The mean blur difference for a particular mean blur value is calculated by summing all combined differences CD of all non-occluded pixels within the M×N neighbourhood of the occluded pixel op which have the particular mean blur value and by normalizing the result using the total number of such non-occluded pixels.

The disparity map updater 208, 209 then assigns the mean blur value which has the lowest mean blur difference as the mean blur value for the occluded pixel op. The disparity map updater 208, 209 then updates the value of the occluded pixel op in the disparity map to the disparity value which corresponds to the assigned mean blur value. The corresponding disparity value is determined using the blur-disparity map.

This process is repeated for each occluded pixel in the disparity map and the result is the updated disparity map. An example of the right-to-left updated disparity map can be seen in FIG. 5I.

It should be noted that, theoretically, there may be two different disparity values for a given blur, as illustrated in FIG. 6. However, the image processing apparatus 20 is configured to assume that one image of the defocused stereo pair is focused on the foreground and that the other image is focused on the background. Consequently, it is clear, for each image, which of the two possible disparity values is correct.

In some examples, the image processing apparatus 20 further comprises a noise reduction module 210. The noise reduction module 210 is configured to receive the first and second updated disparity map data $UD_{L-R}$, $UD_{R-L}$ and to process the data to reduce the noise therein.

The noise reduction module 210 may be configured to apply at least one filter to each of the sets of data thereby to reduce the noise. More specifically, the noise reduction module 210 may apply a first filter to the first and second updated disparity map data $UD_{L-R}$, $UD_{R-L}$. In some examples it may further apply a second filter to the first-filtered updated disparity map data. Each of the first and second filters may be applied one or more times. The first filter may, in some examples, be one of a morphological erosion filter and a morphological dilation filter. The second filter may be the other one of the morphological erosion filter and a morphological dilation filter. In one specific example, the morphological erosion filter may be applied one or more times to each of the sets of updated disparity map data $UD_{L-R}$, $UD_{R-L}$ and, subsequently, the morphological dilation filter may be applied the same number of times to the morphologically eroded updated disparity data. In other examples, different de-noising filters, for instance a median filter, may be used.

The output from the noise reduction module 210 is first and second sets of improved disparity map data $ID_{L-R}$, $ID_{R-L}$. The sets of improved disparity map data $ID_{L-R}$, $ID_{R-L}$ may be used for, for example, determining the distance of one or more objects in the stereo images from the camera modules. Other uses of the improved disparity map include, for example, 3D rendering, region segmentation and scene analysis.

Although the schematic illustration of FIG. 3 shows the image processing apparatus 20 receiving the original image data $I_L$, $I_R$, and outputting the improved disparity map data $ID_{L-R}$, $ID_{R-L}$, in some other examples, image processing apparatus 20A according to examples of embodiments may instead receive pre-generated occlusion map $O_{L-R}$, $O_{R-L}$ and blur data $B_L$, $B_R$ in addition to the disparity map data $D_{L-R}$, $D_{R-L}$ and may output the updated disparity map data $UD_{L-R}$, $UD_{R-L}$. Put another way, image processing apparatus 20A according to examples of the invention may comprise only one or both of the first and second blur-disparity map generators 206, 207 and one or both of the first and second disparity map updaters 208, 209. In other examples, the image processing apparatus may further comprise the noise reduction module 210 in addition to the blur-disparity map generators 206, 207 and the disparity map updaters 208, 209. Alternatively or additionally, the image processing apparatus may additionally comprise any combination of the disparity map generator 201, the occlusion map generators 202, 203 and the blur map generators 204, 205.

Figure 4:
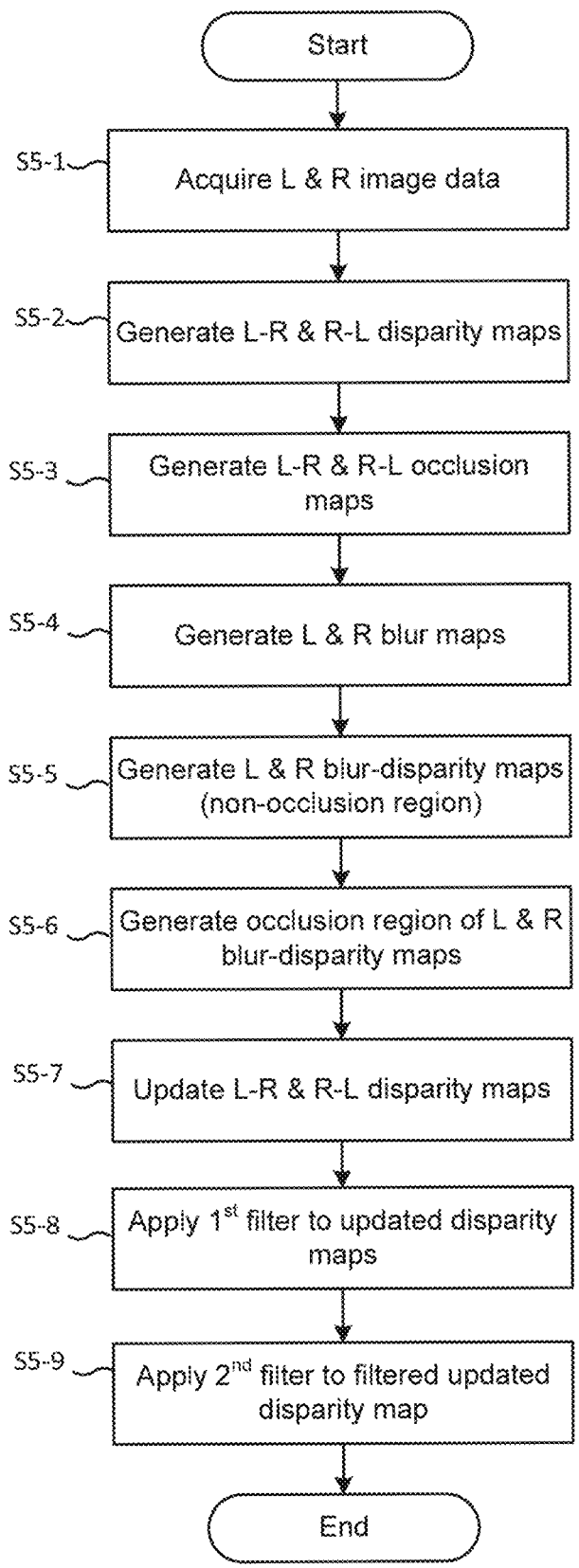
FIG. 4 is a flow chart illustrating operations which may be performed by the image processing apparatus of FIG. 3.

As will, of course, be appreciated each of the functional blocks illustrated in FIG. 4 may be referred to as "means for" performing the function of that functional block. As such, the image processing apparatus 20A may be said to comprise, for example, means 206, 207 for generating first and second blur-disparity map data and means 208, 209 for updating first and second disparity map data.

It will also be understood that the schematic of FIG. 3 is purely for illustrative purposes. As such, although in FIG. 3 a function (e.g. disparity map generation by the disparity map generator 201) is shown to be performed by a single functional block, it will be understood that the function may instead be performed by two or more functional blocks. Similarly, although particular functions are shown to be performed by separate functional blocks, they may instead be performed by a single functional block. For instance, the left and right blur map generation may be performed by a single functional block instead of the two blocks 204, 205 illustrated in FIG. 3. Likewise, although two occlusion map generators 202, 203 have been illustrated in FIG. 3, these may be replaced by a single occlusion map generator which outputs both sets of occlusion map data $O_{L-R}$, $O_{R-L}$. In addition or alternatively, functions of different types (e.g. blur map generation and occlusion map generation) may be performed by a single functional block.

FIG. 4 is a flow chart illustrating various operations which may be performed by the image processing apparatus 20.

In operation $S_{5-1}$, the left and right (or first and second) stereo image data $I_L$, $I_R$ is acquired. The left and right images are a "defocused pair" of stereo images. Acquiring the image data may occur in any suitable way. For instance, the image processing apparatus 20 may control first and second camera modules 14, 16 to capture the image data $I_L$, $I_R$ and to pass it to the image processing apparatus 20. Alternatively, the stereo image data $I_L$, $I_R$ may be received at the image processing apparatus 20 via a wired or wireless connection with a network or via a removable memory medium 50. In another alternative, the stereo image data $I_L$, $I_R$ may be captured using a single camera module whose position and orientation is altered between capturing each of the pair of images. The first and second sets of image data may have been subjected to some processing between capture and provision to the image processing apparatus 20. For instance, the captured images could be subjected to rectification to generate the stereo image data received at the image processing apparatus 20.

In operation $S_{5-2}$, the image processing apparatus 20 generates the left-to-right (or left or first) disparity map data $D_{L-R}$ and the right-to-left (or right or first) disparity map data $D_{R-L}$ based on the acquired stereo image data $I_L$, $I_R$. This may be performed as described with reference to the disparity map generator 201 of FIG. 3.

In operation $S_{5-3}$, the image processing apparatus 20 processes the left stereo image data $I_L$ based on the left-to-right disparity map data $D_{L-R}$ to generate the left-to-right (or left or first) occlusion map data $O_{L-R}$. The image processing apparatus 20 also processes the right image data $I_R$ based on the right-to-left disparity map data $D_{R-L}$ to generate the right-to-left (or right or second) occlusion map data $O_{R-L}$. The occlusion map generation may be performed as described with reference to the occlusion map generators 202, 203 of FIG. 3.

In operation $S_{5-4}$, the image processing apparatus 20 processes the left stereo image data $I_L$ to produce the left (or first) blur map data. The image processing apparatus also processes the right stereo image data $I_R$ to produce the right (or left) blur map data. Generation of the blur map data may be performed using any depth-from-defocus technique.

In operation $S_{5-5}$, the image processing apparatus 20, 20A generates the blur-disparity map data for the non-occluded regions of the respective stereo images $I_L$, $I_R$.

In operation $S_{5-6}$, the image processing apparatus 20, 20A generates the blur-disparity map data for the occluded regions of the respective stereo images $I_L$, $I_R$. This is combined with the blur-disparity map data for the non-occluded regions to form the complete blur-disparity map data $BD_L$, $BD_R$.

The left (or first or left-to-right) blur-disparity map data $BD_L$ is generated, in operations $S_{5-5}$ and $S_{5-6}$, based on the left-to-right disparity map data $D_{L-R}$ produced in operation $S_{5-2}$, the left-to-right occlusion map data $O_{L-R}$ generated in operation $S_{5-3}$, and the left blur map data $B_L$ generated in operation $S_{5-4}$. The right (or second or right-to-left) blur-disparity map data $BD_R$ is generated, in operations $S_{5-5}$ and $S_{5-6}$, based on the right-to-left disparity map data $D_{R-L}$ produced in operation $S_{5-2}$, the right-to-left occlusion map data $O_{R-L}$ generated in operation $S_{5-3}$, and the right blur map data $B_L$ generated in operation $S_{5-4}$. The blur-disparity map data $BD_L$, $BD_R$ for the non-occluded and occluded regions is generated as described with reference to blur-disparity map generators 206, 207 of FIG. 3.

In operation $S_{5-7}$, the image processing apparatus 20, 20A updates the disparity map data $D_L$, $D_R$ generated in operation $S_{5-2}$, to produce the updated disparity map data $UD_L$, $UD_R$. More specifically, the updated left-to-right disparity map $UD_{L-R}$ data is calculated using the left blur-disparity map data $BD_L$, the left-to-right occlusion map data $O_{L-R}$, and the left-to-right disparity map data $D_{L-R}$. The updated right-to-left disparity map $UD_{R-L}$ data is calculated using the right blur-disparity map data $BD_R$, the right-to-left occlusion map data $O_{R-L}$, and the right-to-left disparity map data $D_{R-L}$. The calculation of the updated disparity map data $UD_{L-R}$, $UD_{R-L}$ is performed as described with reference to the disparity map updaters 208, 209 of FIG. 3.

In operation $S_{5-8}$, the image processing apparatus 20 applies a first filter to the sets of updated disparity map data $UD_{L-R}$, $UD_{R-L}$. One or multiple iterations of the filtering of operation $S_{5-8}$ may be performed. The first filter may be one of a morphological erosion filter and a morphological dilation filter.

In operation $S_{5-9}$, the image processing apparatus 20 applies a second filter to the first-filtered sets of updated disparity map data $UD_{L-R}$, $UD_{R-L}$. One or multiple iterations of the filtering of operation $S_{5-9}$ may be performed. The same number of iterations of the second filtering may be performed as were performed for the first filtering. The second filter may be the other one of a morphological erosion filter and a morphological dilation filter. In some embodiments, the morphological erosion filter is applied in operation $S_{5-8}$ and the morphological dilation filter is subsequently applied in operation $S_{5-9}$.

The result of operation $S_{5-9}$ is the first and second sets of improved disparity map data $ID_{L-R}$, $ID_{R-L}$.

It will of course be appreciated that the various operations of the flow chart of FIG. 4 may be performed in a different order and/or concurrently with each other. Similarly, one or more of the operations may be omitted or combined. For instance, in some embodiments, at least one of operations $S_{5-1}$, $S_{5-2}$, $S_{5-3}$, $S_{5-4}$ may be performed by a different image processing apparatus to that which performs operations $S_{5-5}$ to $S_{5-7}$. Alternatively or additionally, operations $S_{5-8}$ and $S_{5-9}$ may be performed by a different processing apparatus.

In some alternative examples, the disparity values for occluded pixels may be determined using only the mean blur values from the blur disparity map data (in other words without calculating the combined difference and mean blur difference etc). However, these examples may provide less accurate results than when the above described method is used. This is because the above-described method not only takes into account the observation that the disparity of an occluded pixel op will be influenced by the disparity of non-occluded pixel p with similar blur (no matter how far away p is from op) but also takes into account the fact that the further pixel p is from occluded pixel op, the higher the possible error that is associated with using the disparity of p to update op (even though the pixels have similar blur).

It should be understood that the terms "stereo image pair" and "pair of stereo images" as used herein are not limited to pairs of images in which objects are only horizontally offset from one another. Indeed the terms are also intended to cover pairs of images in which objects are only vertically offset and pairs of images which are both vertically and horizontally offset from one another.

Although, the image processing apparatus 20, 20A is shown in FIG. 1 as part of, for instance, a portable electronic device it will be appreciated that image processing apparatus may 20, 20A may instead by part of, for example, an image processing server or a personal computer.

Reference to "computer-readable memory medium", "computer program product", "tangibly embodied computer program" etc, or a "processor" or "processing circuitry" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method comprising:
   estimating disparity values for pixels located in an occluded region of a first one of a defocused pair of stereo images using:
   a first set of blur map data corresponding to the first one of the defocused pair of stereo images;
   a first set of disparity map data corresponding to the first one of the defocused pair of stereo images; and
   a first set of occlusion map data corresponding to the first one of the defocused pair of stereo images; and
   generating a first set of blur-disparity map data corresponding to the first one of the defocused pair of stereo images, the first set of blur-disparity map data being generated based on:
   the first set of disparity map data;
   the first set of occlusion map data; and
   the first set of blur map data,
   wherein each pixel in the first set of blur-disparity map data has an associated mean blur value, and wherein estimating the disparity values for the pixels located in the occluded region of the first one of the defocused pair of stereo images comprises:
using the first set of occlusion map data to identify at least one occluded pixel in the first set of blur-disparity map data; and
for each occluded pixel in the first set of blur-disparity map data:
calculating a combined difference between the mean blur value of the occluded pixel and the mean blur value of each non-occluded pixel in the first set of blur-disparity map data within an M×N neighbourhood of the occluded pixel;
for each mean blur value within the M×N neighbourhood, calculating the mean blur difference; and
identifying the mean blur value having the lowest mean blur difference, wherein the estimated disparity value for the occluded pixel is the disparity value which corresponds to the mean blur value having the lowest mean blur difference.

2. The method of claim 1 comprising updating the first set of disparity map data with the estimated disparity values to generate a first set of updated disparity map data.

3. The method of claim 2, comprising:
applying at least one filter to the first set of updated disparity map data.

4. The method of claim 3, comprising:
applying a first filter to the first set of updated disparity map data; and
applying a second filter to the first-filtered first set of updated disparity map data.

5. The method of claim 4, wherein the first filter is one of a morphological erosion filter and a morphological dilation filter and wherein the second filter is the other of the morphological erosion filter and the morphological dilation filter.

6. The method of claim 1, wherein generating the first set of blur-disparity map data comprises:
using the first set of occlusion map data to identify pixels in the first set of disparity map data which correspond to the non-occluded pixels in the first one of the defocused pair of stereo images, each identified pixel in the set of disparity map data having a disparity value;
for each different disparity value of the identified pixels:
identifying a set of non-occluded pixels in the first set of blur map data, the set of non-occluded pixels in the first set of blur map data corresponding to the identified pixels in the first set of disparity map data which have the different disparity value, each identified non-occluded pixel in the first set of blur map data having a blur value;
calculating the mean blur value of the set of non-occluded pixels in the first set of blur map data; and
assigning the calculated mean blur value to the pixels in the first set of blur-disparity map data which correspond to the identified set of non-occluded pixels in the first set of blur map data.

7. The method of claim 6, comprising, if none of the previously-calculated mean blur values have a contributing pixel having the blur value of an identified occluded pixel in the first set of blur map data, assigning to the occluded pixel in the first set of blur-disparity map data, which corresponds to the identified occluded pixel, the mean blur value which is closest to the blur value of the identified occluded pixel.

8. The method of claim 1, wherein the combined difference is a weighted average of the absolute difference between the mean blur value of the occluded pixel and the mean blur value of the non-occluded pixel and the geometric Euclidian distance between occluded pixel and the non-occluded pixel.

9. The method of claim 1, wherein the mean blur difference for each mean blur value within the M×N neighbourhood is calculated by summing the combined differences of all the non-occluded pixels having the mean blur value and normalising the result by the total number of the non-occluded pixels having the mean blur value.

10. The method of claim 1, comprising:
generating the first set of disparity map data using the pair of stereo images.

11. The method of claim 1 comprising:
generating the first set of occlusion map data using the first one of the defocused pair of stereo images and the first set of disparity map data.

12. The method of claim 1, comprising:
generating the first set of blur map data using the first one of the defocused pair of stereo images.

13. The method of claim 1 comprising:
estimating disparity values for pixels located in an occluded region of a second one of a defocused pair of stereo images using:
a second set of blur map data corresponding to the second one of the defocused pair of stereo images;
a second set of disparity map data corresponding to the second one of the defocused pair of stereo images; and
a second set of occlusion map data corresponding to the second one of the defocused pair of stereo images.

14. The method of claim 13 comprising:
generating a second set of blur-disparity map data corresponding to the second one of the defocused pair of stereo images, the second set of blur-disparity map data being generated based on:
the second set of disparity map data;
the second set of occlusion map data; and
the second set of blur map data;
estimating the disparity values for the pixels located in the occluded region of the second one of the defocused pair of stereo images using the second set of occlusion map data and the second set of blur-disparity map data.

15. The method of claim 13 comprising updating the second set of disparity map data with the estimated disparity values for pixels located in the occluded region of the second one of the defocused pair of stereo images, to generate a second set of updated disparity map data.

16. The method of claim 15, comprising:
applying at least one filter to the second set of updated disparity map data.

17. The method of claim 16, comprising:
applying a first filter to the second set of updated disparity map data; and
applying a second filter to the first-filtered second set of updated disparity map data.

18. The method of claim 17, wherein the first filter is one of a morphological erosion filter and a morphological dilation filter and wherein the second filter is the other of the morphological erosion filter and the morphological dilation filter.

19. An apparatus comprising:
at least one processor; and
at least one memory including computer program code, the at least one memory and the computer program code configured to, with the at least one processor, cause the apparatus at least to:

estimate disparity values for pixels located in an occluded region of a first one of a defocused pair of stereo images using:
a first set of blur map data corresponding to the first one of the defocused pair of stereo images;
a first set of disparity map data corresponding to the first one of the defocused pair of stereo images; and
a first set of occlusion map data corresponding to the first one of the defocused pair of stereo images; and
generate a first set of blur-disparity map data corresponding to the first one of the defocused pair of stereo images, the first set of blur-disparity map data being generated based on:
the first set of disparity map data;
the first set of occlusion map data; and
the first set of blur map data,
wherein each pixel in first set of blur-disparity map data has an associated mean blur value, and wherein the at least one memory and the computer program code are configured to, with the at least one processor, cause the apparatus to estimate the disparity values for the pixels located in the occluded region of the first one of the defocused pair of stereo images by:
using the first set of occlusion map data to identify at least one occluded pixel in the first set of blur-disparity map data; and
for each occluded pixel in the first set of blur-disparity map data:
calculating a combined difference between the mean blur value of the occluded pixel and the mean blur value of each non-occluded pixel in the first set of blur-disparity map data within an M×N neighbourhood of the occluded pixel;
for each mean blur value within the M×N neighbourhood, calculating the mean blur difference; and
identifying the mean blur value having the lowest mean blur difference, wherein the estimated disparity value for the occluded pixel is the disparity value which corresponds to the mean blur value having the lowest mean blur difference.

20. The apparatus of claim 19, the at least one memory and the computer program code being configured to, with the at least one processor, cause the apparatus to:
update the first set of disparity map data with the estimated disparity values to generate a first set of updated disparity map data.

21. The apparatus of claim 20, the at least one memory and the computer program code being configured to, with the at least one processor, cause the apparatus to:
apply at least one filter to the first set of updated disparity map data.

22. The apparatus of claim 21, the at least one memory and the computer program code being configured to, with the at least one processor, cause the apparatus to:
apply a first filter to the first set of updated disparity map data; and
apply a second filter to the first-filtered first set of updated disparity map data.

23. The apparatus of claim 22, wherein the first filter is one of a morphological erosion filter and a morphological dilation filter and wherein the second filter is the other of the morphological erosion filter and the morphological dilation filter.

24. The apparatus of claim 19, the at least one memory and the computer program code being configured to, with the at least one processor, cause the apparatus to generate the first set of blur-disparity map data by:
using the first set of occlusion map data to identify pixels in the first set of disparity map data which correspond to the non-occluded pixels in the first one of the defocused pair of stereo images, each identified pixel in the set of disparity map data having a disparity value;
for each different disparity value of the identified pixels:
identifying a set of non-occluded pixels in the first set of blur map data, the set of non-occluded pixels in the first set of blur map data corresponding to the identified pixels in the first set of disparity map data which have the different disparity value, each identified non-occluded pixel in the first set of blur map data having a blur value;
calculating the mean blur value of the set of non-occluded pixels in the first set of blur map data; and
assigning the calculated mean blur value to the pixels in the first set of blur-disparity map data which correspond to the identified set of non-occluded pixels in the first set of blur map data.

25. The apparatus of claim 24, the at least one memory and the computer program code being configured to, with the at least one processor, cause the apparatus to:
if none of the previously-calculated mean blur values have a contributing pixel having the blur value of an identified occluded pixel in the first set of blur map data, assign to the occluded pixel in the first set of blur-disparity map data, which corresponds to the identified occluded pixel, the mean blur value which is closest to the blur value of the identified occluded pixel.

26. The apparatus of claim 19, wherein the combined difference is a weighted average of the absolute difference between the mean blur value of the occluded pixel and the mean blur value of the non-occluded pixel and the geometric Euclidian distance between occluded pixel and the non-occluded pixel.

27. The apparatus of claim 19, wherein the at least one memory and the computer program code are configured to, with the at least one processor, cause the apparatus to calculate the mean blur difference for each mean blur value within the M×N neighbourhood by summing the combined differences of all the non-occluded pixels having the mean blur value and normalising the result by the total number of the non-occluded pixels having the mean blur value.

28. The apparatus of claim 19, the at least one memory and the computer program code being configured to, with the at least one processor, cause the apparatus to:
generate the first set of disparity map data using the pair of stereo images.

29. The apparatus of claim 19, the at least one memory and the computer program code being configured to, with the at least one processor, cause the apparatus to:
generate the first set of occlusion map data using the first one of the defocused pair of stereo images and the first set of disparity map data.

30. The apparatus of claim 19, the at least one memory and the computer program code being configured to, with the at least one processor, cause the apparatus to:
generate the first set of blur map data using the first one of the defocused pair of stereo images.

31. The apparatus of claim 19, the at least one memory and the computer program code being configured to, with the at least one processor, cause the apparatus to:
estimate disparity values for pixels located in an occluded region of a second one of a defocused pair of stereo images using:
a second set of blur map data corresponding to the second one of the defocused pair of stereo images;

a second set of disparity map data corresponding to the second one of the defocused pair of stereo images; and a second set of occlusion map data corresponding to the second one of the defocused pair of stereo images.

32. The apparatus of claim 31, the at least one memory and the computer program code being configured to, with the at least one processor, cause the apparatus to:
generate a second set of blur-disparity map data corresponding to the second one of the defocused pair of stereo images, the second set of blur-disparity map data being generated based on:
the second set of disparity map data;
the second set of occlusion map data; and
the second set of blur map data;
estimate the disparity values for the pixels located in the occluded region of the second one of the defocused pair of stereo images using the second set of occlusion map data and the second set of blur-disparity map data.

33. The apparatus of claim 31, the at least one memory and the computer program code being configured to, with the at least one processor, cause the apparatus to: update the second set of disparity map data with the estimated disparity values for pixels located in the occluded region of the second one of the defocused pair of stereo images to generate a second set of updated disparity map data.

34. The apparatus of claim 33, the at least one memory and the computer program code being configured to, with the at least one processor, cause the apparatus to:
apply at least one filter to the second set of updated disparity map data.

35. The apparatus of claim 34, the at least one memory and the computer program code being configured to, with the at least one processor, cause the apparatus to:
apply a first filter to the second set of updated disparity map data; and
apply a second filter to the first-filtered second set of updated disparity map data.

36. The apparatus of claim 35, wherein the first filter is one of a morphological erosion filter and a morphological dilation filter and wherein the second filter is the other of the morphological erosion filter and the morphological dilation filter.

37. The apparatus of claim 19, wherein the apparatus is portable electronic device.

38. A non-transitory computer-readable storage medium having stored thereon computer-readable code, which, when executed by computing apparatus, causes the computing apparatus to perform a method comprising:
estimating disparity values for pixels located in an occluded region of a first one of a defocused pair of stereo images using:
a first set of blur map data corresponding to the first one of the defocused pair of stereo images;
a first set of disparity map data corresponding to the first one of the defocused pair of stereo images; and
a first set of occlusion map data corresponding to the first one of the defocused pair of stereo images; and
generating a first set of blur-disparity map data corresponding to the first one of the defocused pair of stereo images, the first set of blur-disparity map data being generated based on:
the first set of disparity map data;
the first set of occlusion map data; and
the first set of blur map data,
wherein each pixel in the first set of blur-disparity map data has an associated mean blur value, and wherein estimating the disparity values for the pixels located in the occluded region of the first one of the defocused pair of stereo images comprises:
using the first set of occlusion map data to identify at least one occluded pixel in the first set of blur-disparity map data; and
for each occluded pixel in the first set of blur-disparity map data:
calculating a combined difference between the mean blur value of the occluded pixel and the mean blur value of each non-occluded pixel in the first set of blur-disparity map data within an M×N neighbourhood of the occluded pixel;
for each mean blur value within the M×N neighbourhood, calculating the mean blur difference; and
identifying the mean blur value having the lowest mean blur difference, wherein the estimated disparity value for the occluded pixel is the disparity value which corresponds to the mean blur value having the lowest mean blur difference.

* * * * *